(12) United States Patent
Yeh et al.

(10) Patent No.: US 10,106,665 B2
(45) Date of Patent: Oct. 23, 2018

(54) METHOD FOR PRODUCING POLYMER NANOFOAM

(71) Applicant: National Taiwan University of Science and Technology, Taipei (TW)

(72) Inventors: Shu-Kai Yeh, Taipei (TW); Zong-En Liao, Taipei (TW); Chien-Chia Chu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 123 days.

(21) Appl. No.: 15/262,600

(22) Filed: Sep. 12, 2016

(65) Prior Publication Data

US 2017/0130023 A1   May 11, 2017

(30) Foreign Application Priority Data

Nov. 10, 2015 (TW) .............................. 104137026 A (51) Int. Cl.
*C08J 9/20* (2006.01)
*C08J 9/12* (2006.01)
*F16L 59/02* (2006.01)

(52) U.S. Cl.
CPC ............. *C08J 9/20* (2013.01); *C08J 9/122* (2013.01); *F16L 59/028* (2013.01); *C08J 2205/042* (2013.01); *C08J 2205/044* (2013.01); *C08J 2205/05* (2013.01); *C08J 2205/052* (2013.01); *C08J 2333/12* (2013.01)

(58) Field of Classification Search
CPC ................................................ C08J 2205/042
See application file for complete search history.

(56) References Cited

U.S. PATENT DOCUMENTS

| | | | |
|---|---|---|---|
| 4,473,665 | A | 9/1984 | Martini-Vvedensky et al. |
| 5,955,511 | A | 9/1999 | Handa et al. |
| 6,555,589 | B1 | 4/2003 | Tan |
| 6,913,517 | B2 | 7/2005 | Prasad |
| 7,435,165 | B2 | 10/2008 | Prasad |

(Continued)

FOREIGN PATENT DOCUMENTS

| | | |
|---|---|---|
| CN | 101616967 | 12/2009 |
| TW | 338052 | 8/1998 |

(Continued)

OTHER PUBLICATIONS

"PMMA-Poly Methyl Methacrylate (Acrylic)" by Pentagon Plastics (Year: 2013).*

(Continued)

*Primary Examiner* — Kara B Boyle
*Assistant Examiner* — Christina H Wales
(74) *Attorney, Agent, or Firm* — J.C. Patents (57) ABSTRACT

A method for producing a polymer nanofoam includes: immersing a polymer material in carbon dioxide at a pressure greater than 5 MPa and a temperature of −30° C. to 40° C. to obtain a carbon dioxide-saturated polymer material, wherein the melt index of the polymer material measured at 230° C. and 3.8 kg is between 0.1 g/10 min and 8.0 g/10 min. Thereafter, the carbon dioxide-saturated polymer material is depressurized to atmospheric pressure, and then the carbon dioxide-saturated polymer material is heated to form the polymer nanofoam.

9 Claims, 5 Drawing Sheets

(56) References Cited

U.S. PATENT DOCUMENTS

| | | | |
|---|---|---|---|
| 7,658,989 | B2 | 2/2010 | DeSimone et al. |
| 7,838,108 | B2 | 11/2010 | Thiagarajan et al. |
| 7,842,379 | B2 | 11/2010 | Thiagarajan et al. |
| 8,283,390 | B2 | 10/2012 | Thiagarajan et al. |
| 8,440,732 | B2 | 5/2013 | Rajendran et al. |
| 8,507,568 | B2 | 8/2013 | Lee et al. |
| 8,529,808 | B2 | 9/2013 | Sandler et al. |
| 9,145,477 | B2 | 9/2015 | Zhu et al. |
| 2006/0127663 | A1 | 6/2006 | Strey et al. |
| 2014/0221512 | A1 | 8/2014 | Costeux et al. |
| 2015/0119482 | A1 | 4/2015 | Kumar et al. |

FOREIGN PATENT DOCUMENTS

| | | |
|---|---|---|
| TW | I227188 | 2/2005 |
| WO | 2009155066 | 2/2010 |
| WO | 2011066060 | 6/2011 |
| WO | 2011112352 | 9/2011 |
| WO | 2013048760 | 4/2013 |
| WO | 2013048761 | 4/2013 |
| WO | 2014052032 | 4/2014 |
| WO | 2014210523 | 12/2014 |

OTHER PUBLICATIONS

Y. Paul Handa, Zhiyi Zhang "A New Technique for Measuring Retrograde Vitrification in Polymer-Gas Systems and for Making Ultramicrocellular Foams from the Retrograde Phase" Journal of Polymer Science: Part B: Polymer Physics, Vo. 38, 716-725. (Year : 2000).*

C. Forest, P. Chaumont, P. Cassagnau, B. Swoboda, P. Sonntag. "CO2 nano-foaming of nanostructured PMMA" Polymer 58, 76-87 . 2014 (Year: 2014).*

Chimezie Okolieocha, Daniel Raps, Kalaivani Subramaniam, Volker Altstadt. "Microcellular to nanocellular polymer foams: Progress (2004-2015) and future directions—A review" European Polymer Journal 73 (2015) 500-519. (Year: 2015).*

Stephane Costeux, Lingbo Zhu. "Low density thermoplastic nanofoams nucleated by nanoparticles" (Year: 2013).*

Vipin Kumar, et al., "A Process for Making Microcellular Thermoplastic Parts," Polymer Engineering and Science, Oct. 1990, vol. 30, No. 20, pp. 1323-1329.

Stéphane Costeuxa, "CO2-Blown Nanocellular Foams," Journal of Applied Polymer Science, Aug. 14, 2014, pp. 41293-1-41293-16.

P. D. Condo, et al., "Retrograde Vitrification of Polymers with Compressed Fluid Diluents: Experimental Confirmation," Macromolecules, vol. 25, No. 24, Nov. 1992, pp. 6730-6732.

P. D. Condo, et al., "Glass Transition Behavior Including Retrograde Vitrification of Polymers with Compressed Fluid Diluents," Macromolecules, vol. 25, No. 23, Nov. 9, 1992, pp. 6119-6127.

A. Victoria Nawaby, et al., "Fundamental Understanding of the ABS-CO2 Interactions, its Retrograde Behavior and Development of Nanocellular Structures," ANTEC 2004: conference proceedings, May 16-20, 2004, pp. 2532-2536.

Stéphane Costeuxa, et al., "Homogeneous nanocellular foams from styrenic-acrylic polymer blends," J. Mater. Res., vol. 28, No. 17, Sep. 14, 2013, pp. 2351-2365.

Stéphane Costeuxa, et al., "Low density thermoplastic nanofoams nucleated by nanoparticles," Polymer, vol. 54, Mar. 28, 2013, pp. 2785-2795.

Stéphane Costeuxa, et al., "Experimental study and modeling of nanofoams formation from single phase acrylic copolymers," Journal of Cellular Plastics, vol. 51, No. 2, Apr. 30, 2014, pp. 197-221.

Jose Antonio Reglero Ruiz, et al., "Investigation of the Nanocellular Foaming of Polystyrene in Supercritical CO2 by Adding a CO2-Philic Perfluorinated Block Copolymer," Journal of Applied Polymer Science, Mar. 22, 2012, pp. 1-8.

Jose Antonio Reglero Ruiz, et al., "Two-step micro cellular foaming of amorphous polymers in supercritical C02," The Journal of Supercritical Fluids, vol. 57, Issue 1, May 2011, pp. 87-94.

Jose Antonio Reglero Ruiz, et al., "Micro and nano cellular amorphous polymers (PMMA, PS) in supercritical CO2 assisted by nanostructured CO2-philic block copolymers—One step foaming process," The Journal of Supercritical Fluids, vol. 58, Issue 1, Aug. 2011, pp. 168-176.

Jose Antonio Reglero Ruiz, et al., "Low-Density Nanocellular Foams Produced by High-Pressure Carbon Dioxide," Macromolecular Materials and Engineering, vol. 296, Mar. 18, 2011, pp. 752-759.

Javier Pinto, et al., "Nanocellular CO2 foaming of PMMA assisted by block copolymer nanostructuration," Chemical Engineering Journal, vol. 243, Jan. 18, 2014, pp. 428-435.

Javier Pinto, et al., "Block Copolymers Self-Assembly Allows Obtaining Tunable Micro or Nanoporous Membranes or Depth Filters Based on PMMA; Fabrication Method and Nanostructures," The Journal of Physical Chemistry C, vol. 118, Feb. 6, 2014, pp. 4656-4663.

Javier Pinto, et al., "Temperature influence and CO2 transport in foaming processes of poly (methyl methacrylate)-block copolymer nanocellular and microcellular foams," The Journal of Supercritical Fluids, vol. 94, Aug. 4, 2014, pp. 198-205.

B. Notario, et al., "Towards a new generation of polymeric foams: PMMA nanocellular foams with enhanced physical properties," Polymer, vol. 63, Mar. 9, 2015, pp. 116-126.

B. Notario, et al., "Experimental validation of the Knudsen effect in nanocellular polymeric foams," Polymer, vol. 56, Oct. 12, 2014, pp. 57-67.

C. Forest, et al., "Generation of nanocellular foams from ABS terpolymers," European Polymer Journal, vol. 65, Nov. 13, 2014, pp. 209-220.

C. Forest, et al., "CO2 nano-foaming of nanostructured PMMA," Polymer, vol. 58, Dec. 26, 2014, pp. 76-87.

C. Forest, et al., "Polymer nano-foams for insulating applications prepared from CO2 foaming," Progress in Polymer Science, vol. 41, Jul. 7, 2014, pp. 122-145.

Huimin Guo, et al., "Solid-state poly(methyl methacrylate) (PMMA) nanofoams. Part II: Low-temperature solid-state process space using CO2 and the resulting morphologies," Polymer, vol. 70, Jun. 17, 2015, pp. 231-241.

Huimin Guo, et al., "Solid-state poly(methyl methacrylate) (PMMA) nanofoams. Part I: Low-temperature CO2 sorption, diffusion, and the depression in PMMA glass transition," Polymer, vol. 57, Dec. 23, 2014, pp. 157-163.

Shanqiu Liu, et al., "Nanocellular polymer foams as promising high performance thermal insulation materials," European Polymer Journal, vol. 65, Feb. 7, 2015, pp. 33-45.

Huimin Guo, et al., "Solid-State Microcellular and Nanocellular Polysulfone Foams," Journal of Polymer Science, Part B: Polymer Physics, vol. 53, Apr. 2, 2015, pp. 975-985.

Huimin Guo, et al., "Some thermodynamic and kinetic low-temperature properties of the PC-CO2 system and morphological characteristics of solid-state PC nanofoams produced with liquid CO2," Polymer, vol. 56, Oct. 15, 2014, pp. 46-56.

Huimin Guo, et al., "Effect of glass transition temperature and saturation temperature on the solid-state microcellular foaming of cyclic olefin copolymer," Journal of Applied Polymer Science, vol. 132, Apr. 4, 2015, pp. 42226-1-42226-8.

Sriharsha S. Sundarram, et al., "On Thermal Conductivity of Micro- and Nanocellular Polymer Foams," Polymer Engineering & Science, vol. 53, Jan. 9, 2013, pp. 1-9.

Pengjian Gong, et al., "Nanoporous structure of the cell walls of polycarbonate foams," Journal of materials science, vol. 49, Dec. 24, 2013, pp. 2605-2617.

Brian Aher, et al., "Production of bulk solid-state PEI nanofoams using supercritical CO2," J. Mater. Res., vol. 28, No. 17, Sep. 14, 2013, pp. 2366-2373.

Dustin Miller, et al., "Microcellular and nanocellular solid-state polyetherimide (PEI) foams using sub-critical carbon dioxide I. Processing and structure," Polymer, vol. 50, Sep. 25, 2009, pp. 5576-5584.

Dustin Miller, et al., "Microcellular and nanocellular solid-state polyetherimide (PEI) foams using sub-critical carbon dioxide II. Tensile and impact properties," Polymer, vol. 52, May 4, 2011, pp. 2910-2919.

(56) References Cited

OTHER PUBLICATIONS

Y. Paul Handa, et al., "A New Technique for Measuring Retrograde Vitrification in Polymer-Gas Systems and for Making Ultramicrocellular Foams from the Retrograde Phase," Journal of Polymer Science Part B: Polymer Physics, vol. 38, Feb. 3, 2000, pp. 716-725.

Zong-En Liao, et al., "Critical Parameters of Generating PMMA Nanocellular Foam," ANTEC 2016, May 23-25, 2016, pp. 1-6.

* cited by examiner

METHOD FOR PRODUCING POLYMER NANOFOAM

CROSS-REFERENCE TO RELATED APPLICATION

This application claims the priority benefit of Taiwan application no. 104137026, filed on Nov. 10, 2015. The entirety of the above-mentioned patent application is hereby incorporated by reference herein and made a part of this specification.

BACKGROUND OF THE INVENTION

Field of the Invention

The invention relates to a method for producing nanofoam, and more particularly, to a method for producing polymer nanofoam.

Description of Related Art

Since the polymer foams have buffer characteristics, and structural characteristics thereof can generate the effect such as energy absorption or heat insulation, the polymer foam is often used as an insulating material.

Currently, a technique in which carbon dioxide is used to prepare a micro foaming material has been developed, and the technique can maintain material characteristics while reducing usage of the material. Such foaming technique produces foaming phenomenon by rapidly depressurizing a polymer in which gas is dissolved or rapidly increasing temperature at a high-pressure state. Microcellular foam can be generated via such a method, and it is believed that, in general, if a cell size less than 10 μm and a cell density greater than $10^9$ cells/cm$^3$ are satisfied, then such a foaming material can be referred to as microcellular foam.

With the development of nanotechnology, the possibility of preparing polymer nanofoams via a carbon dioxide foaming technique has also been explored in recent years. However, except for the difficulty of producing nanoscale cells, the main difficulty of above research includes increasing cell density from microscale (i.e. greater than $10^9$ cells/cm$^3$) to $10^{12}$ cells/cm$^3$, even increasing to $10^{15}$-$10^{16}$ cells/cm$^3$.

SUMMARY OF THE INVENTION

The invention provides a method for producing a polymer nanofoam capable of producing polymer nanofoam having nanoscale cell size and high cell density.

The method for producing a polymer nanofoam of the invention includes: immersing a polymer material in carbon dioxide at a pressure greater than 5 MPa and a temperature of −30° C. to 40° C. to obtain a carbon dioxide-saturated polymer material, wherein a melt index of the polymer material measured at 230° C. and 3.8 kg is between 0.1 g/10 min and 8.0 g/10 min. Then, the carbon dioxide-saturated polymer material is depressurized to atmospheric pressure. Then, the carbon dioxide-saturated polymer material is heated to form the polymer nanofoam.

In an embodiment of the invention, the average cell size of the polymer nanofoam is, for instance, between 10 nm and 1000 nm.

In an embodiment of the invention, the cell density of the polymer nanofoam is, for instance, $10^{12}$ cells/cm$^3$ or more.

In an embodiment of the invention, the relative density of the polymer nanofoam is, for instance, between 0.1 and 0.9.

In an embodiment of the invention, the polymer nanofoam is, for instance, a closed-cell structure, an open-cell structure, or a combination thereof.

In an embodiment of the invention, the pressure during the immersion of the polymer material is, for instance, between 6.9 MPa and 30 MPa.

In an embodiment of the invention, the temperature of heating the carbon dioxide-saturated polymer material is, for instance, between 0° C. and 115° C.

In an embodiment of the invention, the time of heating the carbon dioxide-saturated polymer material is, for instance, between 1 second and 300 seconds.

In an embodiment of the invention, the weight-average molecular weight of the polymer material is, for instance, between 30,000 g/mol and 130,000 g/mol.

In an embodiment of the invention, the polymer material is, for instance, polymethyl methacrylate (PMMA), polycarbonate (PC), a cyclic olefin copolymer (COC), polysulfone (PSU), polylactic acid (PLA), thermoplastic urethane (TPU), or acrylonitrile-butadiene-styrene (ABS).

Based on the above, according to the invention, a polymer material having a specific range in melt index (MI) is used as the raw material, and after immersing the polymer material in carbon dioxide at low temperature and high pressure and then foaming at high temperature and normal pressure, it may form a polymer nanofoam having nanoscale cell size and high cell density.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
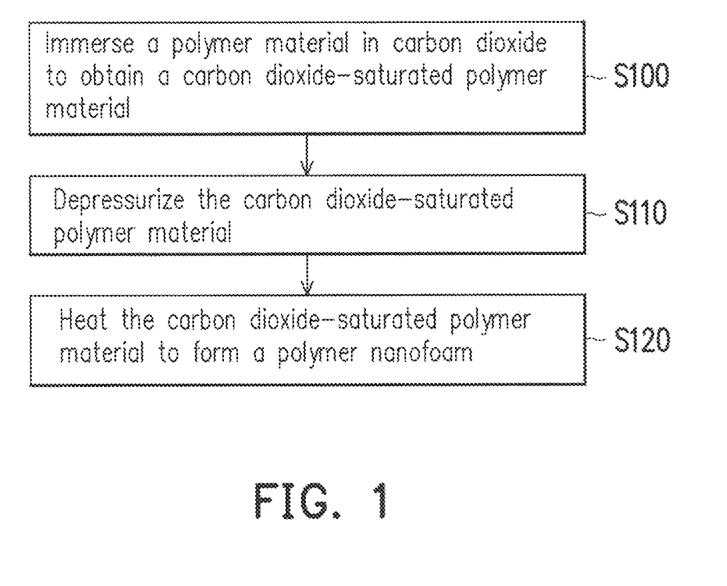
FIG. 1 is a flow chart of the production process of a polymer nanofoam according to an embodiment of the invention.
Figure 2:
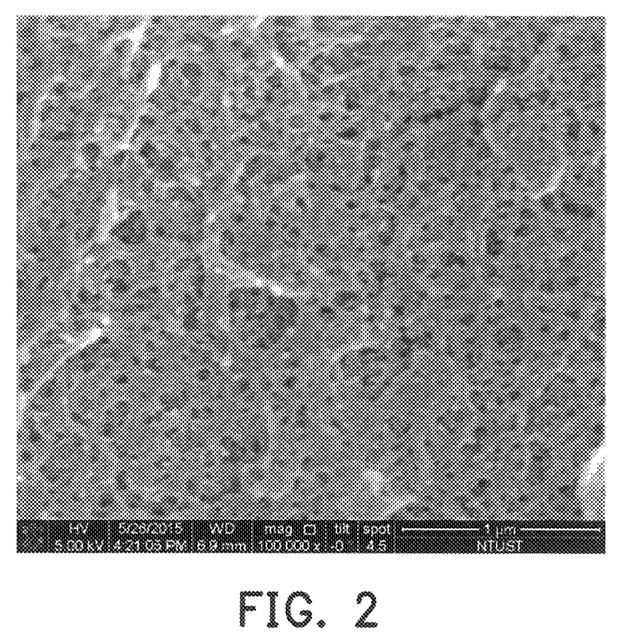
FIG. 2 is a field-emission scanning electron microscope (FE-SEM) micrograph of the polymethyl methacrylate (PMMA) foam formed in experimental example 1.
Figure 3:
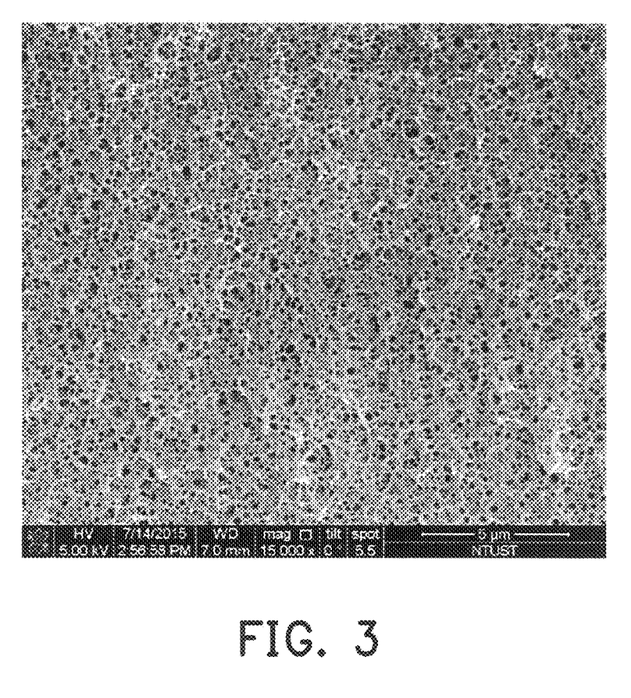
FIG. 3 is a FE-SEM micrograph of the PMMA foam formed in experimental example 2.
Figure 4:
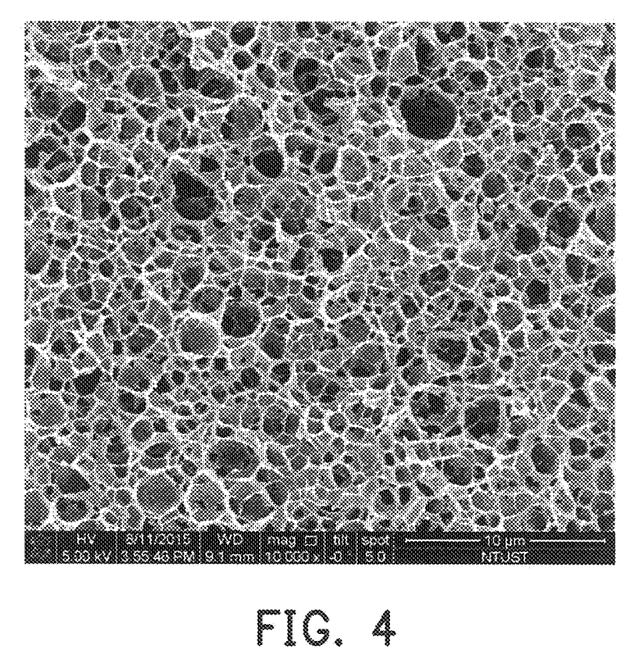
FIG. 4 is a FE-SEM micrograph of the PMMA foam formed in experimental example 3.
Figure 5:
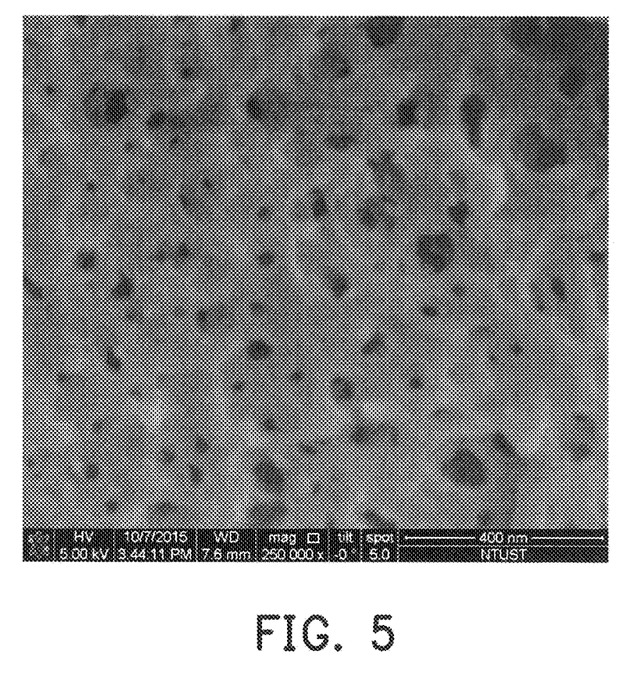
FIG. 5 is a FE-SEM micrograph of the PAAM foam formed in experimental example 4.
Figure 6:
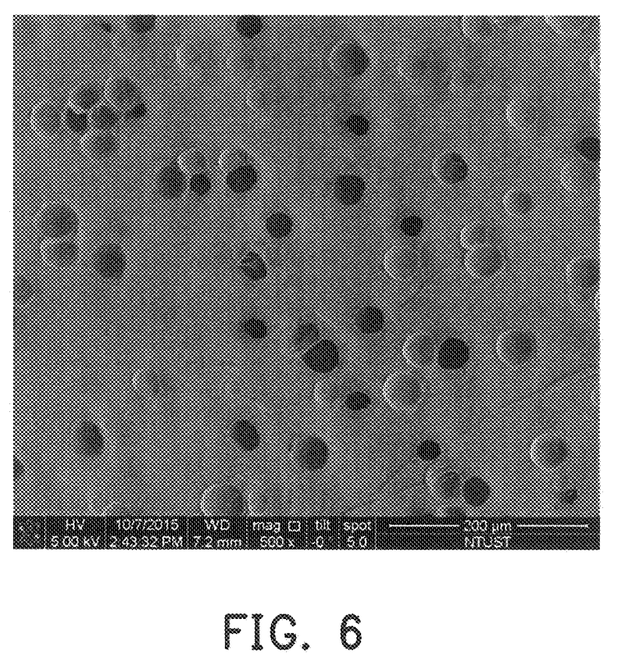
FIG. 6 is a FE-SEM micrograph of the PMMA foam formed in comparative example 1.
Figure 7:
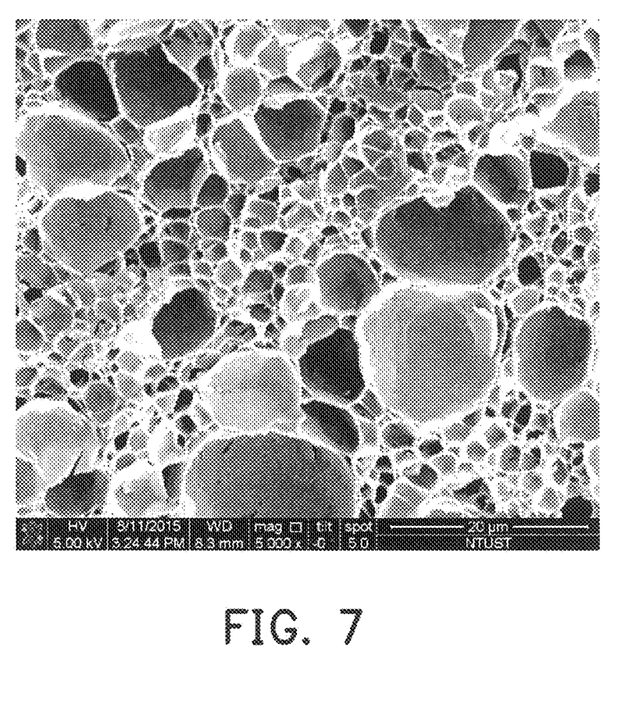
FIG. 7 is a FE-SEM micrograph of the PAAM foam formed in comparative example 2.
Figure 8:
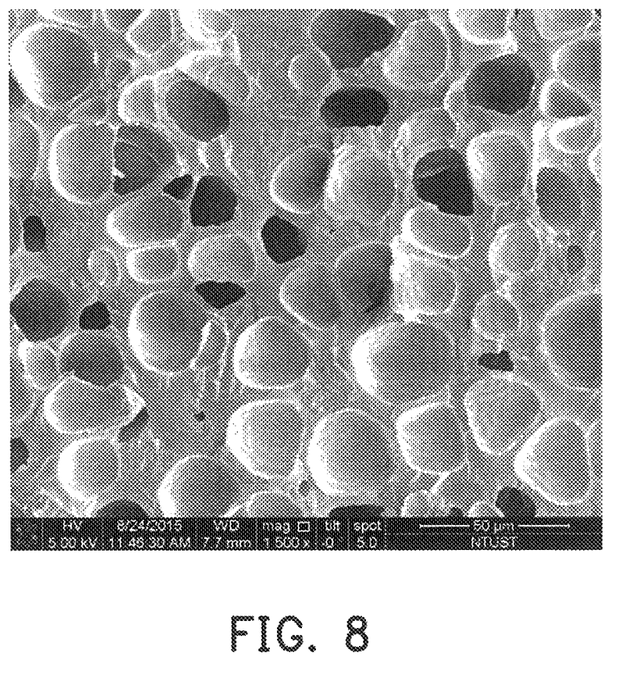
FIG. 8 is a FE-SEM micrograph of the PMMA foam formed in comparative example 3.

FIG. 1 is a flow chart of the production process of a polymer nanofoam according to an embodiment of the invention.

Referring to FIG. 1, first, step S100 is performed to immerse a polymer material in carbon dioxide so as to obtain a carbon dioxide-saturated polymer material, wherein the pressure during the immersion the polymer material is greater than 5 MPa, and the temperature during the immersion the polymer material is between −30° C. and 40° C. The polymer material has a melt index (MI) (3.8 kg/230° C.) in step S100 is between 0.1 g/10 min and 8.0 g/10 min, and therefore a polymer material having high viscosity characteristics is utilized. In the present embodiment, a pure polymer material is used to produce nanofoams; in other words, the nanofoams are produced by using the foregoing polymer material without any nucleating agent, but it is not limited thereto. In another embodiment, the polymer material can include an insignificant amount of a non-polymeric additive, and the non-polymeric additive can promote foaming of the polymer material, such as silicon nanoparticles or other suitable non-polymeric additives. The polymer material is, for instance, polymethyl methacrylate (PMMA), polycarbonate (PC), a cyclic olefin copolymer (COC), polysulfone (PSU), polylactic acid (PLA), thermoplastic urethane (TPU), or acrylonitrile-butadiene-styrene (ABS). In the case of polymethyl methacrylate, the weight-average molecular weight ($M_w$) thereof is, for instance, between 30,000 g/mol and 130,000 g/mol, preferably between 60,000 g/mol and 80,000 g/mol. The poly dispersity index (PDI) of polymethyl methacrylate is, for instance, between 1.2 and 2.2. The polymethyl methacrylate is, for instance, a general commercial polymethyl methacrylate or a lab-made polymethyl methacrylate.

The method of immersing the polymer material includes, for instance, first placing the polymer material in a high-pressure tank, and then injecting carbon dioxide under the conditions of, for instance, a high pressure between 6.9 MPa and 30 MPa and a low temperature between 0° C. and 40° C. in order to saturate the polymer material with carbon dioxide. Since at a fixed pressure, a lower temperature corresponds to a higher solubility of carbon dioxide in the polymer material, in the present embodiment, it may accomplish the desired cell size by controlling the pressure and the temperature during the immersion of the polymer material.

During the immersion process of the polymer material, carbon dioxide is absorbed inside the polymer material to reach saturation, and in the present embodiment, the time of immersing the polymer material is, for instance, between 1 hour and 48 hours; preferably between 1 hour and 24 hours.

Moreover, before step S100, a drying treatment can be optionally performed on the polymer material. For instance, the polymer material is placed in an oven to dry. More specifically, the polymer material can be placed in an oven and dried at high temperature for several hours to remove water, so as to reduce influence from moisture. However, the invention is not limited thereto, and step S100 can be directly performed in the absent of drying treatment.

Then, step S110 is performed to depressurize the carbon dioxide-saturated polymer material to atmospheric pressure. In the present embodiment, the carbon dioxide-saturated polymer material is depressurized to atmospheric pressure and then removed from the high-pressure tank, for instance.

Then, step S120 is performed to heat the carbon dioxide-saturated polymer material so as to form the polymer nanofoam. Specifically, when the temperature is increased above the glass transition temperature of the carbon dioxide-saturated polymer material, nucleation and cell growth occur within the polymer material, and foaming is generated as a result. The carbon dioxide-saturated polymer material can be heated using a general heating device. For instance, a hot bath, an oil bath, hot air, vapor, radiation, a heating plate, and the like can be used to heat the carbon dioxide-saturated polymer material. In the case of PMMA in the present embodiment, the temperature of heating the carbon dioxide-saturated PMMA is, for instance, 115° C. or less, such as between 0° C. and 115° C., between 0° C. and 100° C., or between 0° C. and 80° C. The time of heating the carbon dioxide-saturated PMMA is, for instance, between 1 second and 300 seconds. At this point, the polymer nanofoam of the present embodiment is obtained.

The cell structure after foaming is, for instance, an open-cell structure, a closed-cell structure, or a combination thereof. The "open-cell structure" is defined as a pore cavity for which one or a plurality of sides is an opening. The open-cell structure can be connected to other open-cell structures or closed-cell structures. The "closed-cell structure" is defined as a pore cavity without openings.

In the present embodiment, after step S120, the polymer nanofoam can be further rapidly cooled to fix the cell structure. For instance, the polymer nanofoam formed after heating can be placed in an ice bath for rapid cooling.

In the present embodiment, since a polymer material having a specific range in melt index is used as raw material for producing the polymer nanofoam, the resulting polymer nanofoam has the characteristics of very small average cell size and high cell density. The "average cell size" is defined as the average cell size obtained by circling more than 100 cells in an electron micrograph (e.g. SEM) photograph and then calculating it by software. The "cell density" is defined as the number of cells per cubic centimeter, and therefore the cell density of the polymer nanofoams can be calculated as following formula:

$$N_0 = \left(\frac{nM^2}{A}\right)^{1.5} \times \left(\frac{\rho_s}{\rho_f}\right)$$

In the above formula, A represents the area of the electron micrograph in $cm^2$, M is the magnification factor, n is the number of cells in the electron micrograph; $\rho_s$ and $\rho_f$ are respectively densities of the sample and the nanofoams, and the unit of $N_0$ is cell numbers per cubic centimeter (cells/$cm^3$).

In an embodiment, the average cell size of the polymer nanofoam is, for instance, between 10 nm and 1000 nm, preferably between 10 nm and 500 nm, and more preferably between 10 nm and 200 nm. In an embodiment, the cell density of the polymer nanofoam is, for instance, $10^{12}$ cells/$cm^3$ or more, preferably $10^{16}$ cells/$cm^3$ or more. Moreover, the "relative density" is defined as the ratio of the density of the polymer nanofoam to the density of the polymer material before foaming. In an embodiment, the relative density of the polymer nanofoam is, for instance, between 0.1 and 0.9; preferably between 0.1 and 0.5.

To prove that the polymer nanofoam obtained via the above method indeed has the characteristics of very small average cell size and high cell density, experimental examples are provided below. The parameters of the following experimental examples and data results thereof are only used to describe the performance of the invention, and are not used to limit the scope of the invention.

Raw Materials

1. Polymer material: polymethyl methacrylate particles;
2. Carbon dioxide.

Equipment

Advanced Polymer Chromatography System (APC from Waters Corporation.),

High-pressure syringe pump (model: ISCO Syringe Pump 260D),

Cooling cycle thermostatic water bath (model: CCB-10),

Precision thermostatic water bath (model: DEAGLE WB212-B1), and

Field-emission scanning electron microscope (FEI Quanta 3D FEG FE-SEM).

Measurement of Molecular Weight

Polymethyl methacrylate particles were first measured at a ratio of 2 mg/ml, a temperature of 45° C., and a measuring time of 8 minutes by using a polystyrene standard product having a specific molecular weight as the standard, and the results are shown in Table 1 below.

Experimental Example 1

First, the polymethyl methacrylate particles were placed in an oven to dry for 8 hours to remove water. Then, the dried polymethyl methacrylate particles were placed in a high-pressure tank, and high-pressure carbon dioxide was injected. Then, polymethyl methacrylate was immersed for 24 hours at a pressure of 13.79 MPa and a temperature of 0° C. to obtain carbon dioxide-saturated polymethyl methacrylate. Detailed parameters are recited in Table 1 below.

Then, depressurization was performed until atmospheric pressure, and then the carbon dioxide-saturated polymethyl methacrylate was removed from the high-pressure tank. Then, the carbon dioxide-saturated polymethyl methacrylate was placed in a circulating thermostatic water bath and heated for 3 minutes to perform foaming. Detailed parameters are recited in Table 1 below.

Then, the polymethyl methacrylate after foaming was placed in an ice bath to cool so as to obtain a polymethyl methacrylate foam. Detailed preparation parameters are recited in Table 1 below.

Experimental Example 2

The polymethyl methacrylate foam was formed using a similar method to experimental example 1, and the difference thereof is only in that the temperature of immersing polymethyl methacrylate was 10° C. Detailed preparation parameters are recited in Table 1 below.

Experimental Example 3

The polymethyl methacrylate foam was formed using a similar method to experimental example 1, and the difference thereof is only in that the temperature of immersing polymethyl methacrylate was 20° C. Detailed preparation parameters are recited in Table 1 below.

Experimental Example 4

The polymethyl methacrylate foam was formed using a similar method to experimental example 1, and the difference thereof is that a polymethyl methacrylate particle sample having a weight-average molecular weight of 64366 g/mol and a melt index of 8 g/10 min was used, and the temperature of immersing polymethyl methacrylate was −10° C. Detailed preparation parameters are recited in Table 1 below.

Comparative Example 1

The polymethyl methacrylate foam was formed using a similar method to experimental example 4, and the difference thereof is only in that a polymethyl methacrylate pellets having a weight-average molecular weight of 58308 g/mol and a melt index of 16 g/10 min was used. Detailed preparation parameters are recited in Table 1 below.

Comparative Example 2

The polymethyl methacrylate foam was formed using a similar method to experimental example 1, and the difference thereof is only in that a polymethyl methacrylate pellets having a weight-average molecular weight of 58308 g/mol and a melt index of 16 g/10 min was used. Detailed preparation parameters are recited in Table 1 below.

Comparative Example 3

The polymethyl methacrylate foam was formed using a similar method to experimental example 1, and the difference thereof is that a polymethyl methacrylate pellets having a weight-average molecular weight of 58308 g/mol and a melt index of 16 g/10 min was used, and the temperature of immersing polymethyl methacrylate was 60° C. Detailed preparation parameters are recited in Table 1 below.

TABLE 1

| | Polymethyl methacrylate | | | Immersing parameters | | | Heating parameters | |
|---|---|---|---|---|---|---|---|---|
| | $M_w$ (g/mol) | $M_n$ (g/mol) | Melt index (g/10 min) | Temp. (° C.) | Pressure (MPa) | Time (hr) | Temp. (° C.) | Time (min) |
| Experimental example 1 | 80698 | 49986 | 1.8 | 0 | 13.79 | 24 | 80 | 3 |
| Experimental example 2 | 80698 | 49986 | 1.8 | 10 | 13.79 | 24 | 80 | 3 |
| Experimental example 3 | 80698 | 49986 | 1.8 | 20 | 13.79 | 24 | 80 | 3 |
| Experimental example 4 | 64366 | 35812 | 8 | −10 | 13.79 | 24 | 80 | 3 |
| Comparative example 1 | 58308 | 32609 | 16 | −10 | 13.79 | 24 | 80 | 3 |
| Comparative example 2 | 58308 | 32609 | 16 | 0 | 13.79 | 24 | 80 | 3 |
| Comparative example 3 | 58308 | 32609 | 16 | 60 | 13.79 | 24 | 80 | 3 |

Observation of Polymethyl Methacrylate Foam

The polymethyl methacrylate foams formed in experimental examples 1 to 4 and comparative examples 1 to 3 were placed in liquid nitrogen for 5 minutes and rapidly fractured using diagonal pliers. Then, the fractured foams were adhered on a platform using carbon paste. Then, the foams and the platform were placed in a gold plating machine (model: JFC-1300) for gold plating. Then, the platform with the foams was placed in an FE-SEM for observation and to take pictures of foam state.

FIG. 2 to FIG. 5 are respectively electron micrographs of the polymethyl methacrylate foams formed in experimental examples 1 to 4. FIG. 5 to FIG. 8 are electron micrographs of the polymethyl methacrylate foams formed in comparative examples 1 to 3. Then, the relative density, the average cell size, and the cell density of the polymethyl methacrylate foams formed in experimental examples 1 to 4 and comparative examples 1 to 3 were estimated according to picture results, and the results are shown in Table 2 below.

TABLE 2

| | Foam structure | | |
|---|---|---|---|
| | Relative density | Average cell size (μm) | Cell density (cells/cm$^3$) |
| Experimental example 1 | 0.25 | 0.037 | $1.13 \times 10^{17}$ |
| Experimental example 2 | 0.2 | 0.089 | $1.08 \times 10^{16}$ |
| Experimental example 3 | 0.14 | 0.973 | $1.27 \times 10^{13}$ |
| Experimental example 4 | 0.43 | 0.049 | $2.15 \times 10^{16}$ |
| Comparative example 1 | 0.287 | 32.02 | $1.45 \times 10^{8}$ |
| Comparative example 1 (small foams between foams) | 0.287 | 0.096 | $5.37 \times 10^{15}$ |
| Comparative example 2 | 0.165 | 125.8 | $4.86 \times 10^{6}$ |
| Comparative example 3 | 0.524 | 20.3 | $2.07 \times 10^{8}$ |

It can be known from the results of Table 2 that, in comparison to comparative examples 1 to 3, the foams formed in experimental examples 1 to 4 all have smaller average cell size and higher cell density. In other words, the use of polymethyl methacrylate having higher viscosity (i.e., lower melt index) can form a foam having smaller average cell size and higher cell density. Moreover, although the small foams between the foams in comparative example 1 are nanoscale, the foam thereof contains cells mostly 32 micrometers or above, and since the super structure and the superadiabatic characteristics needed to achieve nanofoams require all of the cells to be nanoscale, a microfoam constitutes a glaring weakness for the material, such that the material loses the special mechanical properties expected from nanofoams, the resulting mechanical properties are similar to microfoams, and as a result the material lacks the special characteristics of nanofoams.

Moreover, in comparison to other experimental examples, the foams formed in experimental example 1 and experimental example 2 have smaller average cell size and higher cell density. This is due to lower immersion temperatures in experimental example 1 and experimental example 2, and therefore the solubility of carbon dioxide is higher, such that smaller cell size can be formed and more cells can be generated, and this difference is more obvious as the temperature is decreased. Regarding experimental example 4 and comparative example 1 having the same low immersion temperatures, since the melt index of experimental example 4 is lower, smaller average cell size and higher cell density can be obtained.

Based on the above, in the invention, a polymer having a specific melt index range is used as the raw material, and foaming is completed via a method of producing a thermodynamic burst unstable phenomenon. As a result, a polymer nanofoam having nanoscale cells and high cell density can be formed.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A method for producing a polymer nanofoam, comprising:
    immersing a polymer material in carbon dioxide at a pressure greater than 5 MPa and a temperature of −30° C. to 40° C. to obtain a carbon dioxide-saturated polymer material, wherein the polymer material has a melt index (3.8 kg/230° C.) of 0.1-8.0 g/10 min, and a weight-average molecular weight of the polymer material is between 30,000 g/mol and 130,000 g/mol;
    depressurizing the carbon dioxide-saturated polymer material to atmospheric pressure; and
    heating the carbon dioxide-saturated polymer material to form the polymer nanofoam.

2. The method of claim 1, wherein an average cell size of the formed polymer nanofoam is between 10 nm and 1000 nm.

3. The method of claim 1, wherein a cell density of the formed polymer nanofoam is $10^{12}$ cells/cm$^3$ or more.

4. The method of claim 1, wherein a relative density of the formed polymer nanofoam is between 0.1 and 0.9.

5. The method of claim 1, wherein the formed polymer nanofoam is a closed-cell structure, an open-cell structure, or a combination thereof.

6. The method of claim 1, wherein a pressure during the immersion of the polymer material is larger than 5 MPa and less than 30 MPa.

7. The method of claim 1, wherein a temperature of heating the carbon dioxide-saturated polymer material is between 0° C. and 115° C.

8. The method of claim 1, wherein a time of heating the carbon dioxide-saturated polymer material is between 1 second and 300 seconds.

9. The method of claim 1, wherein the polymer material comprises polymethyl methacrylate (PMMA), polycarbonate (PC), a cyclic olefin copolymer (COC), polysulfone (PSU), polylactic acid (PLA), thermoplastic urethane (TPU), or acrylonitrile-butadiene-styrene (ABS).

* * * * *